United States Patent
Allen et al.

(10) Patent No.: US 10,657,098 B2
(45) Date of Patent: May 19, 2020

(54) AUTOMATICALLY REORGANIZE FOLDER/FILE VISUALIZATIONS BASED ON NATURAL LANGUAGE-DERIVED INTENT

(71) Applicant: International Business Machines Corporation, Armonk, NY (US)

(72) Inventors: Corville O. Allen, Morrisville, NC (US); Andrew R. Freed, Cary, NC (US); Adrianus P. Vrouwenvelder, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 15/205,647

(22) Filed: Jul. 8, 2016

(65) Prior Publication Data
US 2018/0011868 A1 Jan. 11, 2018

(51) Int. Cl.
*G06F 16/00* (2019.01)
*G06F 16/16* (2019.01)
(Continued)

(52) U.S. Cl.
CPC ............. *G06F 16/16* (2019.01); *G06F 16/11* (2019.01); *G06F 16/14* (2019.01); *G06F 16/168* (2019.01);
(Continued)

(58) Field of Classification Search
CPC .... G06F 16/16; G06F 16/168; G06F 16/2457; G06F 16/24575; G06F 16/24578
(Continued)

(56) References Cited

U.S. PATENT DOCUMENTS 7,937,352 B2  5/2011  Acharya
8,286,085 B1*  10/2012  Denise ................. G06Q 10/107
                                                              715/752
(Continued)

FOREIGN PATENT DOCUMENTS

WO    2005022413 A1    3/2005

OTHER PUBLICATIONS

Anonymous, ip.com, "Method and System for Predicting and Displaying Next Possible Windows for a Task" http://ip.com/IPCOM/000239425D; Nov. 5, 2014.
(Continued)

*Primary Examiner* — Thu Nguyet T Le
(74) *Attorney, Agent, or Firm* — Terrile, Cannatti & Chambers, LLP; Stephen A. Terrile

(57) ABSTRACT

A method, system and computer-usable medium are disclosed for computing file system management. A corpus of content is processed to extract metadata associated with folders and files referenced by a directory structure. Natural Language Processing (NLP) operations are then performed on the corpus to generate concept and entity data associated with each folder and file, followed by performing Natural Language (NL) classification operations to generate intent classification data, which in turn is processed to determine ranked, dominant intents for each folder and file. The corpus content, extracted metadata, concept and entity data, and ranked dominant intents are then processed to generate indexed content and term data. Application context data associated with an interaction is collected and processed to determine a user intent, which is then processed with the indexed content and term data to identify a corresponding folder and file, which in turn are provided to the user.

20 Claims, 8 Drawing Sheets

(51) Int. Cl.
*G06F 17/27* (2006.01)
*G06F 16/11* (2019.01)
*G06F 16/14* (2019.01)

(52) U.S. Cl.
CPC ........ *G06F 17/278* (2013.01); *G06F 17/2735* (2013.01)

(58) Field of Classification Search
USPC .......................................................... 707/758
See application file for complete search history.

(56) References Cited

U.S. PATENT DOCUMENTS

| | | | |
|---|---|---|---|
| 8,473,532 B1 | 6/2013 | Ben | |
| 8,903,752 B1 | 12/2014 | Pacovsky et al. | |
| 9,141,709 B1 | 9/2015 | Keslin et al. | |
| 10,152,533 B2* | 12/2018 | Lindberg | G06F 16/345 |
| 2003/0237093 A1* | 12/2003 | Marsh | G06F 3/0481 |
| | | | 725/46 |
| 2005/0076095 A1* | 4/2005 | Mathew | G06Q 10/06 |
| | | | 709/217 |
| 2008/0168134 A1* | 7/2008 | Goodman | H04L 51/12 |
| | | | 709/204 |
| 2008/0168340 A1* | 7/2008 | Jang | G06F 16/168 |
| | | | 715/206 |
| 2009/0083338 A1* | 3/2009 | Evans | H04L 51/04 |
| 2009/0248615 A1* | 10/2009 | Drory | G06F 16/16 |
| 2010/0211575 A1 | 8/2010 | Collins et al. | |
| 2013/0110792 A1 | 5/2013 | Hudis et al. | |
| 2014/0258297 A1 | 9/2014 | Davari | |
| 2015/0310072 A1* | 10/2015 | Dietz | G06F 16/22 |
| | | | 707/741 |
| 2016/0246816 A1* | 8/2016 | Abiri | G06F 16/192 |

OTHER PUBLICATIONS

Anonymous, ip.com, "System and Method for Hierarchical Automated Recycle Bins" http://ip.com/IPCOM/000213156D; Dec. 6, 2011.
High, R., "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

US 10,657,098 B2

AUTOMATICALLY REORGANIZE FOLDER/FILE VISUALIZATIONS BASED ON NATURAL LANGUAGE-DERIVED INTENT

BACKGROUND OF THE INVENTION

Field of the Invention

The present invention relates in general to the field of computers and similar technologies, and in particular to software utilized in this field. Still more particularly, it relates to a method, system and computer-usable medium for computing file system management.

Description of the Related Art

Files utilized in the performance of computing operations are often organized in a hierarchical directory or folder system, which are typically navigated through the use of a file manager. Such file managers provide a user interface (UI) for performing a variety of file and folder management operations, including creating, opening, renaming, moving, copying and deleting. Certain file managers also provide a search feature to locate a particular file, which is often displayed as a static thumbnail or icon. However, switching from their current activity to a search mode can be disorienting to a user, often causing them to lose their train of thought.

Furthermore, these approaches to file management generally rely on manual processes to create, organize, manage and search the directories, typically through the use of file name, type and date metadata. As a result, these processes can become more time consuming, tedious and error-prone as the number of files grows, their naming conventions become more complicated, and their associated directory structures become more complex. Moreover, deciding what to name each file, and where to store it, can become challenging over time. For example, should a file be stored according to its name, type, associated subject, date, author, or some combination thereof? Consequently, finding a particular file afterwards can prove frustrating as the user may not remember its location or the rationale of why it was stored where it was.

While approaches exist for automating the process of creating and organizing directories, they are typically directed towards either organizing existing files or automating the placement of newly-generated files. For example, certain approaches automatically organize emails based upon analysis of the content they contain and who sent them. Other approaches include the implementation of a tagging system instead of organizing files hierarchically, but they require discipline to maintain their effectiveness. As a result, the default approach to locating a particular file within a system typically requires a user to either navigate to the file based on their knowledge of its location or using a keyword search to find a file by knowing its file name. Alternatively, a desktop search engine can be implemented to index a user's files for more comprehensive keyword searches. While such searches may prove useful for locating a file based upon its content, they are unable to locate a file within the context of a user's interaction with a given application or another user.

SUMMARY OF THE INVENTION

A method, system and computer-usable medium are disclosed for computing file system interaction In various embodiments, a corpus of content is processed to extract metadata associated with individual folders and files referenced by a directory structure. Natural Language Processing (NLP) operations are then performed on the corpus to generate concept and entity data associated with each folder and file. Thereafter, Natural Language (NL) classification operations are performed on each folder and file to generate intent classification data, which in turn is processed to determine ranked, dominant intents for each folder and file. The corpus content, extracted metadata, concept and entity data, and ranked dominant intents are then processed to generate indexed content and term data.

When an interaction associated with a first user is detected, its associated application context data is collected and processed to determine a user intent, which in turn is processed with the indexed content and term data to identify a folder and file corresponding to the user intent. The identified folder and file are then provided to the first user. In various embodiments, the NLP operations may include domain clustering, entity detection, and identity resolution. In certain embodiments, the application context data may include information associated with a file type associated with a software application executing on a computing device used by the first user, an online chat session or email exchange conducted between the first user and a second user, a browser application used by the first user to access web-based content, a search query submitted by the first user, or a response to a search query submitted by the first user.

In certain embodiments, the application context data is processed to modify a visual attribute associated with the reference to the folder and file. In these embodiments, the modified visual attribute is then used as the reference to the folder and file. In various embodiments, the application context data and the user intent are processed to generate a corresponding intent scoring value for each folder and file, which is then used to sort the folders and files according to their respective intent scoring values. The references to the folders and files are then provided to the first user in their sorted order.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
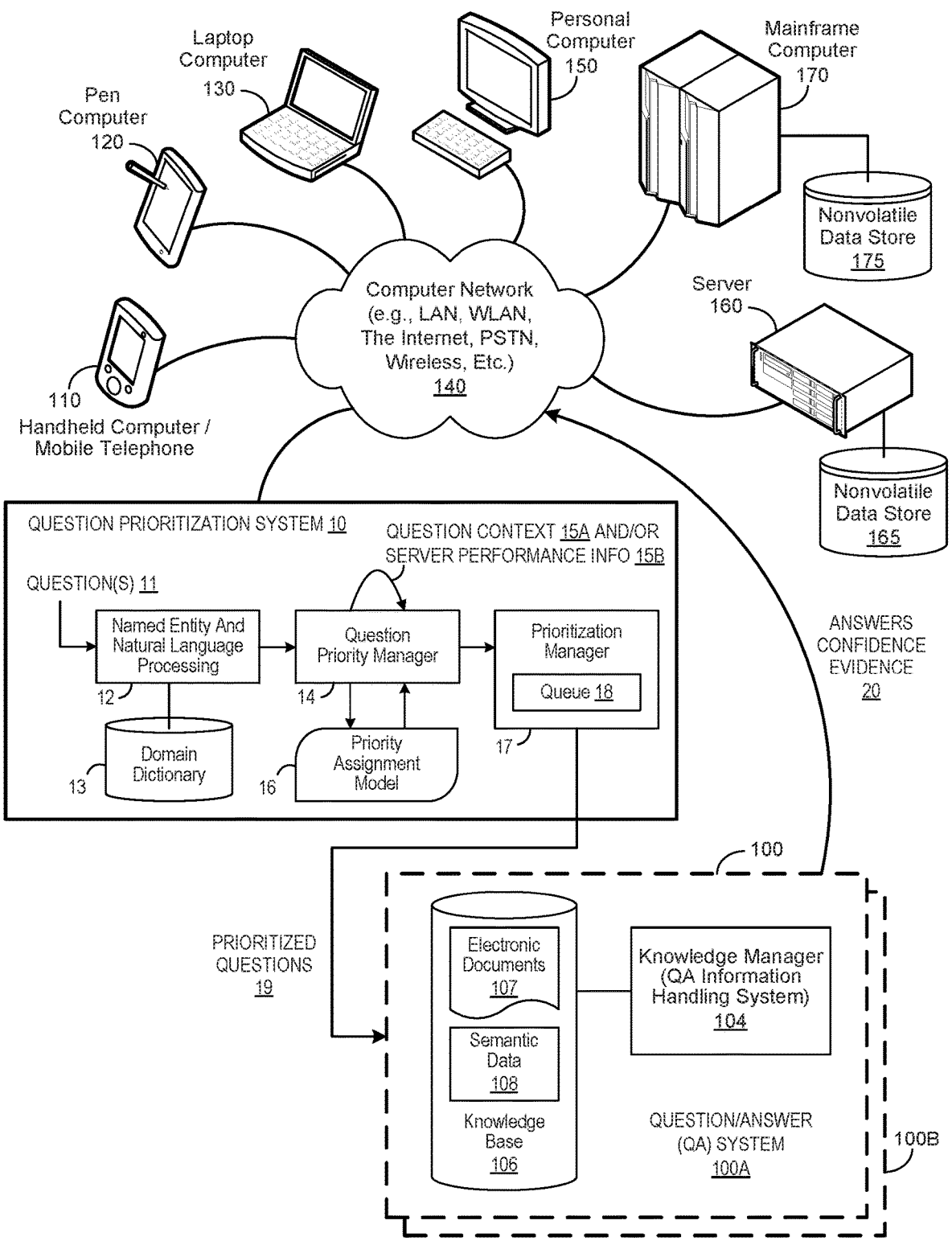
FIG. 1 depicts an exemplary client computer in which the present invention may be implemented.

A method, system and computer-usable medium are disclosed for computing file system management. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A, In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are dequeued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
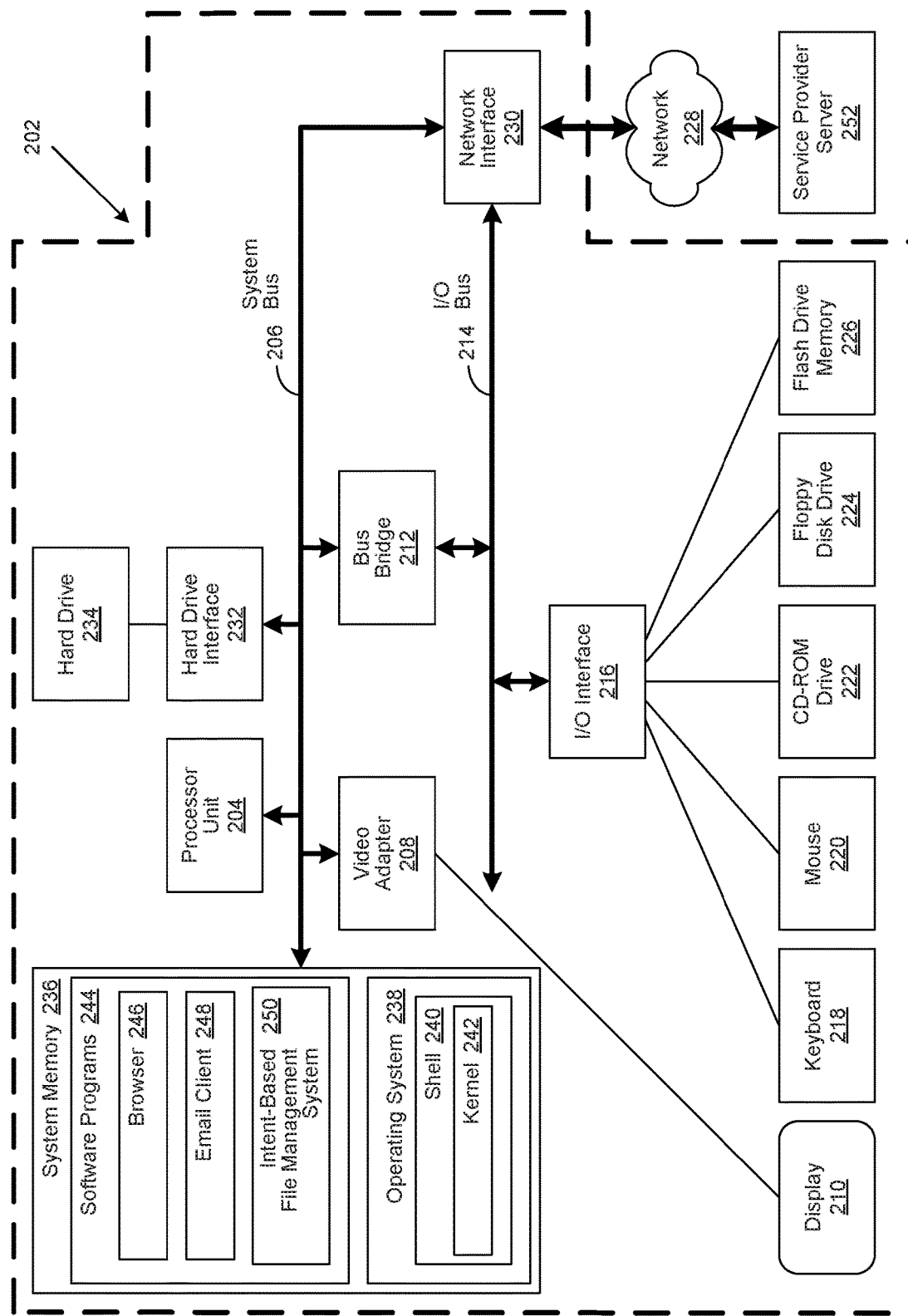
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 8, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include an intent-based file management system 250. In these and other embodiments, the intent-based file management system 250 includes code for implementing the processes described hereinbelow. In one embodiment, information processing system 202 is able to download the intent-based file management system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
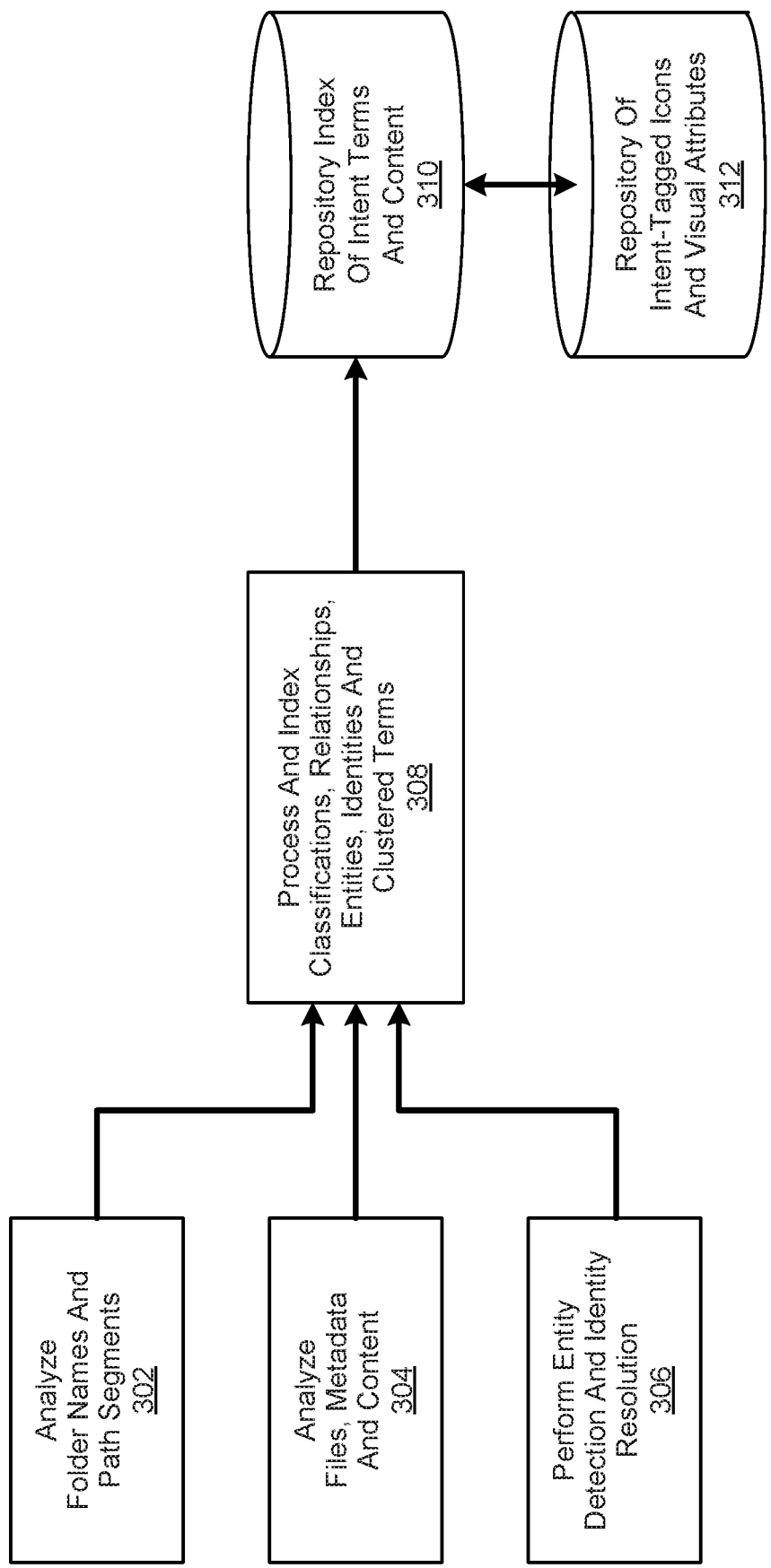
FIG. 3 is a simplified block diagram of an intent-based file management system implemented to ingest and index a corpus of content.

FIG. 3 is a simplified block diagram of an intent-based file management system implemented in accordance with an embodiment of the invention to ingest and index a corpus of content. In various embodiments, the intent-based file management system is implemented to monitor and analyze a user's interactions with software applications on a computing device to determine an application context, described in greater detail herein. In these embodiments, Natural Language Processing (NLP) approaches known to skilled practitioners of the art are then applied to the resulting application context to extract entities. In turn, the extracted entities are used by the intent-based file management system to automatically locate and present files and directories that are most contextually-relevant to the user's current use of the software application.

As an example, it is common for users to interact with various software applications, such as an email client or an online chat client, to enable an electronic communication. In this example, the resulting electronic communications provide the context needed to locate one or more relevant files. To continue the example, two users may be having an online chat session related to a patent document that needs to be signed and returned prior to it being filed with the patent office. In certain embodiments, the intent-based file management system would automatically present the patent document file(s) most likely to be relevant to the chat session.

In various embodiments, the intent-based file management system is implemented to operate in conjunction with a file manager to automatically present one or more contextually-relevant files within a user interface (UI) associated with the file manager. As used herein, a file manager broadly refers to a computing system application that provides a user interface to perform a variety of file and folder management operations. Such file managers provide a UI for performing a variety of file and folder management operations, including creating, opening, renaming, moving, copying and deleting. Various file managers are also known to provide a search feature to locate a particular file. In certain embodiments, the contextually-relevant files are automatically located and presented to the user within the file manager's UI without requiring the navigation of a directory structure or the performance of a key word search.

In various embodiments, the intent-based file management system is implemented to operate in conjunction with a stand-alone, intent-based file finder system. In these embodiments, the intent-based file finder system may provide certain features and functionalities commonly associated with various file managers, but does not require their concurrent operation. In certain embodiments, the intent-based file finder system may be invoked through a user gesture, such as a finger swipe or a right-mouse-click, within a user interface (UI) associated with a software application being used by a user.

In one embodiment, the file(s) most likely to be relevant to the user's current interaction are displayed within a user interface (UI) window associated with the intent-based file finder system. Once displayed, the user can select the desired file through a user gesture, such as a finger tap or a mouse-click. In another embodiment, selection of a presented file results in its automatic attachment to an email or online chat message. In yet another embodiment, selection of a presented file results in the selected file being opened by an associated software application. In various embodiments, the contextually-relevant files presented to a user may be located in different file directories. In certain embodiments, the source directory of a presented file is displayed to the user within a LA window associated with a file manager or a stand-alone, intent-based file finder. Those of skill in the art will recognize that many such embodiments and examples are possible and the foregoing is not intended to limit the spirit, scope or intent of the invention.

Referring now to FIG. 3, individual files or folders within a corpus of content are selected for analysis and processing. The method by which the individual files or folders are selected for analysis and processing is a matter of design choice. If a folder is selected, it is analyzed in block 302 for its name, the names of folders it may contain, the file names and file types the folders may contain, their associated path segments, and other metadata. If a file is selected, its associated metadata, such as the file's name, author, last modification date, location within a directory structure, frequency of use, type (e.g., document, spreadsheet, audio file etc.), association with a particular application, and so forth, is collected and then analyzed in block 304.

Natural Language Processing (NLP) ingestion operations familiar to skilled practitioners of the art are then performed on each selected file or folder in block 306 to generate associated concept and entity data. In various embodiments, the NLP ingestion operations performed in block 306 may include domain clustering, entity detection, and identity resolution. As used herein, domain clustering broadly refers to statistical analysis of the density of concepts associated with a particular knowledge domain within a corpus. As an example, a document with a total word count of 1,706 words may contain the words such as "airplane," "pilot," "aerobatics" and "airshow," all of which represent concepts relating to the knowledge domain of "flying," and account for 14% of the words in the document. Likewise, the same document may also contain words such as "thrilling," "exhilarating" and "breathtaking," which all relate to concepts associated with the knowledge domain of "excitement," and in turn make up 6% of the document. In this example, the two domain clusters are "flying" and "excitement," respectively representing 17% and 6% of the document. Accordingly, the statistical distribution of the words and concepts respectively related to the two knowledge domains may be interpreted to indicate that the document is more oriented to "flying" than "excitement." However, the two domain clusters may be contextually related to one another. To continue the example, if "flying" and "excitement" are identified as the two statistically dominant and contextually-related knowledge domains within the document, then it is likely that the document relates to exciting airshow exhibitions rather than mundane commercial air travel.

As likewise used herein, entity detection, also commonly referred to as named-entity recognition, entity chunking, and entity extraction, broadly refers to information extraction operations associated with identifying and classifying textual elements within a corpus into predefined categories. Examples of such categories include the names of people and things, organizations, locations, expressions of time, quantities, monetary values, percentages, and so forth. Identity resolution, as likewise used herein, broadly refers to the performance of operations associated with identifying and understanding possible identity matches and non-obvious relationships across multiple data sources, such as the various folders and files that may be referenced by a directory structure. As such, it is commonly implemented to analyze a broad variety of information relating to individuals and other entities from multiple sources of data, which may or may not be present within a given corpus. As an example, one or more external knowledge sources describing relationships between known entities may be utilized for reference data in certain embodiments.

In various embodiments, the information used to perform the NLP analysis operations may likewise include file types stored in various folders, file path segments, directory and file names, or any combination thereof. In certain of these embodiments, the NLP analysis operations result in the generation of augmented file classification information. The resulting folder names, path segments, file and folder metadata, file content, domain clustering, detected entity, resolved identity information, and file classification information is then processed in block 308 to generate associated indices. In various embodiments, likelihood and probability scoring approaches known to those of skill in the art are implemented to determine which identities are a match and what, if any, non-obvious relationships exist between them.

If a selected file is a document, then it is analyzed in block 308 to identify sentences associated with one of more knowledge domains. The resulting sentences are then provided to an intent determination system, such as a Natural Language (NL) classifier, for processing. In various embodiments, analysis operations are performed in block 308 on metadata associated with an image, video, audio, or other binary file to associate it with one or more knowledge domains. For example, the metadata may include information related to the content of the file, such as color schemes, associated individuals or locations, subject matter, and so forth. In certain embodiments, analysis operations are performed in block 308 on metadata associated with a folder to associate it with one or more knowledge domains. As an example, the metadata may include information related to the types, or subjects, of files the folder contains.

The resulting sentences, or metadata, are then processed in block 308 to generate intent classification data, which in turn is processed to determine, and rank, the dominant intents associated with the selected file or folder. Indexing operations are then performed on the ranked, dominant intents, along with top terms, folder names, path segments, file and folder metadata, file content, domain clustering, detected entity, resolved identity information, augmented file classification information to generate indexed content and term data. The resulting indexed content and term data is then stored in a repository index of intent terms and content 310.

The indexed content and term data stored in the repository index of intent terms and content 310 is then further processed to associate various icons and visual attributes (e.g., color scheme, graphical elements, typeface, layout, etc.) stored in a repository of intent-tagged icons and visual attributes 312. In various embodiments, the selected folder or file is tagged to indicate its association with various icons and visual attributes intended to better illustrate the content and characteristics of the folder or file. The resulting associations are then indexed and stored in the repository index of intent terms and content 310.

Figure 4:
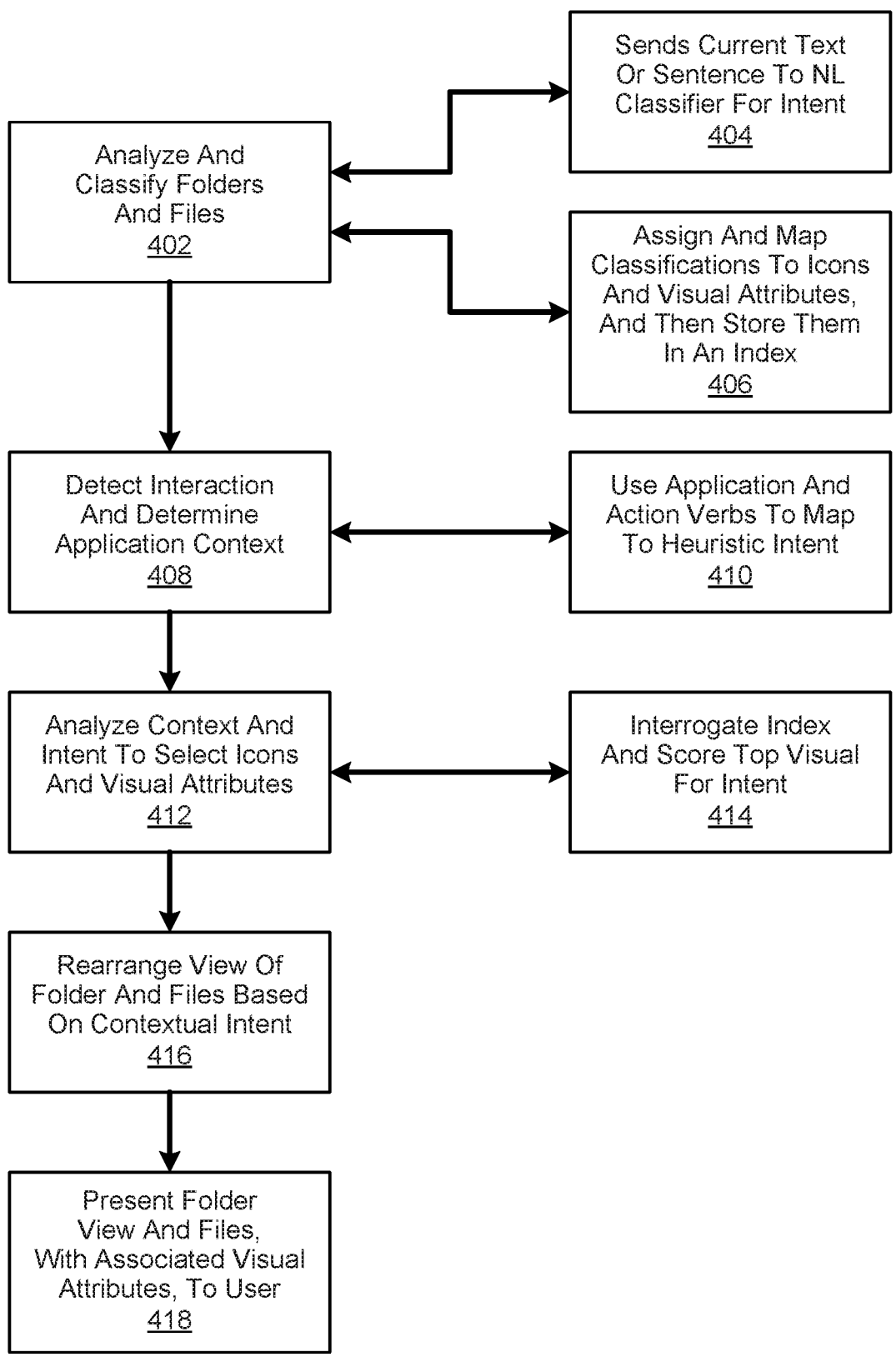
FIG. 4 is a generalized process flow diagram of the operation of an intent-based file management system.

FIG. 4 is a generalized process flow diagram of the operation of an intent-based file management system implemented in accordance with an embodiment of the invention. In this embodiment, selected folders and files are analyzed and classified, as described in greater detail herein, in block 402. As likewise described in greater detail herein, sentences associated with one or more knowledge domains in document files are provided to an intent determination system, such as a Natural Language (NL) classifier, where they are processed in block 404 to determine their respective intent. Likewise, as described in greater detail herein, classifications resulting from operations performed in block 402 are associated with various icons and visual aspects (e.g., color scheme, graphical elements, typeface, layout, etc.) in block 406. In various embodiments, multiple icons or visual aspects may be associated with a given folder or file, dependent upon its classification. The resulting associations are then indexed and stored in a repository of intent terms and content.

If an interaction is detected, then its application context is determined in block 408. The method by which the interaction is detected is a matter of design choice. As used herein, an interaction broadly refers to a user's interaction with a computing device. In various embodiments, the interaction may include a user interacting with a software application executing on a local or remote computing device. As an example, the user may be using a desktop computer to compose a word processing document, construct a financial spreadsheet, or create a graphical image. As another example, the user may be using a laptop or tablet computer to access a web site to purchase an item, access their bank account to pay bills, or plan upcoming business travel.

In certain embodiments, the interaction may include an exchange of information between a user and another individual. In these embodiments, the interaction with the other individual may include the use of one or more software applications executing on a local or remote computing device. As an example, a first user may conduct an online chat session with a second user. In this example, the first and second users use a chat application executing of their respective devices to communicate with a remote server providing an online chat service. As another example, one or more emails may be exchanged between a first user and a second user. In various embodiments, the email exchange may be related to a particular subject or activity. In certain embodiments, the email exchange may be related to a request and a corresponding response. Those of skill in the art will realize that many such examples of an interaction are possible, and the foregoing is not intended to limit the spirit, scope or intent of the invention.

In one embodiment, the interaction is an online chat session. In this embodiment, the application context may include the identity of the two or more participants in the online chat session and the topic(s) of discussion. In certain embodiments, the identity of the two or more participants may include their respective names, titles, roles, location, and contact information. In another embodiment, the interaction is an email exchange, which may include composing an email to be sent to a recipient, or conversely, reviewing an email received from a sender. In this embodiment, the application context of the email exchange may include the identity of the sender and recipient(s), the topic(s) of the email, and the type or content of any email attachments (e.g., documents, spreadsheets, graphics or image files, video and audio files, etc.). In various embodiments, the identity of the sender and recipient(s) may include their respective names, titles, roles, location, and contact information.

In yet another embodiment, the interaction is a user's use of a browser to visit a web site or to access web-based content. In this embodiment, the application context may include the identity of the user, the current web page being visited, the preceding history of web pages visited, the content provided by such pages, the last search query, a preceding history of search queries, corresponding search results, or any combination thereof. In various embodiments, the identity of the user may include their name, title, role or location.

In yet still another embodiment, the interaction is a user's use of one or more software applications executing on a local or remote computing device. In one embodiment, the application context is the software application, and its type, currently in use by the user. In another embodiment, the application context may include a usage history of various software applications, and their respective types, used by the user. In certain embodiments, the application context may include information the software application has received from, and provided to, the user.

In various embodiments, the application context includes a user's intent. As used herein, user intent broadly refers to what the user desires to accomplish through the utilization of a particular software application. In certain embodiments, user intent is determined by monitoring and analyzing a user's interactions with one or more software applications. As an example, a user may receive an email from a coworker, which contains a series of requests. In the course of reviewing the email, the user may highlight certain requests, or alternatively, hover a mouse cursor for various periods of time over certain portions of the email text, either of which may signify the user's intent to respond in part or in full. To continue the example, the intent to respond to one or more of the requests may require the user providing certain information stored in one or more files, which in turn need to be located by the user before they can respond.

In various embodiments, the user's intent may be determined by monitoring and analyzing a user's usage history of one or more software applications. As an example, a user may historically attach a spreadsheet (e.g., a weekly expense report) to an email sent to the same entity (e.g., their manager) every Friday afternoon. In this example, the user intent is to compose an email every Friday afternoon, attach a weekly expense report in spreadsheet form, and send it to their manager. In certain embodiments, the software application currently in use by the user, and action verbs used during the identified interaction, may be used in block 410 to map the application context to heuristic intent.

The resulting application context and user intent are then analyzed in block 412 to select icons and visual attributes, as described in greater detail herein, for the selected folder or files. In various embodiments, the resulting contextual analysis is used to determine context elements that are relevant to the operation of the intent-based file management system, such as extracted entities. In certain of these embodiments, the contextual analysis is then used to select a target folder. In one embodiment, the target folder is the default folder for the software application currently in use. In another embodiment, the target folder is the folder most recently used by the software application currently in use.

In yet another embodiment, the target folder is the folder that is most commonly used by the software application, the user, or a combination of the two. In yet still another embodiment, the target folder contains file types commonly associated with the software application currently in use. In various embodiments, the application context may include named entities. In certain of these embodiments, the application context is used to modify various visual attributes (e.g., color scheme, graphical elements, typeface, layout, etc.) of the folder and its associated file icons, as described in greater detail herein.

In certain embodiments, a scoring algorithm is then applied in block 414 to each application context and user intent related to an interaction, based upon direct match and correlation, to respectively generate an associated intent scoring value. In various embodiments, the direct match and correlation includes the number of similar clustered terms, based upon associated indices stored in the index repository of intent terms and content. In one embodiment, the scoring algorithm weights named entities higher than synonyms, which are in turn weighted higher than direct terms.

If any resulting intent scoring values are above a predetermined threshold value, then icons and visual attributes are selected for the file or folder according to their respective type. Each item in the current folder is sorted or rearranged in block 416 according to its respective intent scoring value. The resulting folder view and file icons are then presented, in their sorted or rearranged order and with their associated visual attributes, to the user in block 418. The method by which the resulting folder view and file icons are presented, and their associated visual attributes are selected, is a matter of design choice.

Figure 5:
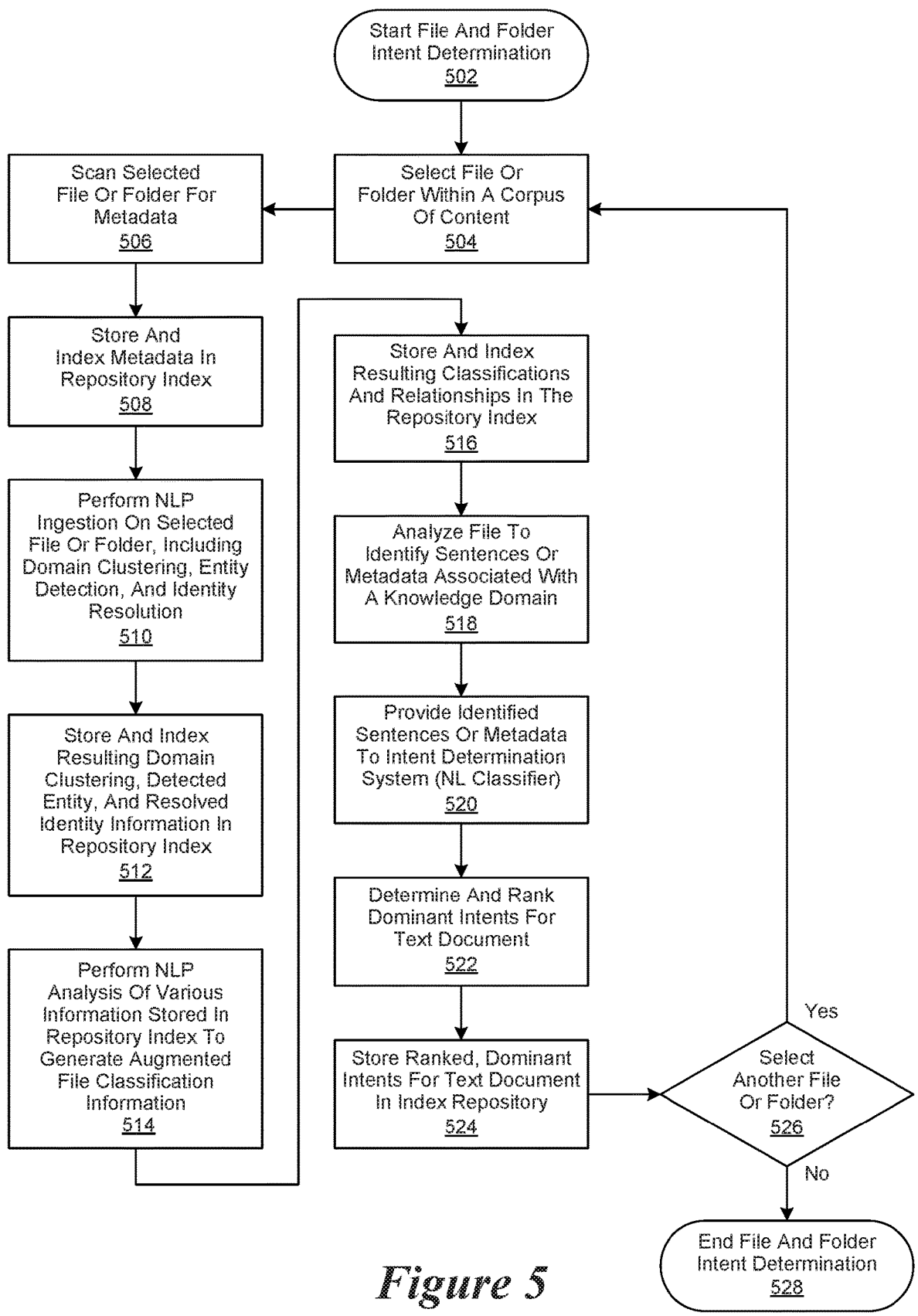
FIG. 5 is a generalized flowchart of the performance of file and folder intent determination operations.

FIG. 5 is a generalized flowchart of the performance of file and folder intent determination operations implemented in accordance with an embodiment of the invention. In this embodiment, file and folder intent determination operations are begun in step 502, followed by the selection of a file or folder within a corpus of content in step 504. The method by which the file or folder is selected for scanning is a matter of design choice. The selected file or folder is then scanned in step 506 for metadata, such as the file's name, author, last modification date, location within a directory structure, frequency of use, association with a particular application, and so forth. The resulting metadata is then stored and indexed in a repository index of intent terms and content, described in greater detail herein, in step 508.

Natural Language Processing (NLP) ingestion operations familiar to skilled practitioners of the art are performed on the selected folder or file in step 510 to generate associated concept and entity data. In various embodiments, the NLP ingestion operations may include domain clustering, entity detection, and identity resolution. The resulting domain clustering, detected entity, and resolved identity information is then stored and indexed in the repository index in step 512. NLP analysis operations are then performed in step 514 on various information stored in the repository index to generate augmented file classification information. In certain embodiments, the augmented file classification information is used in the performance of file classification and relationship establishment operations familiar to those of skill in the art. In various embodiments, the information used to perform the NLP analysis operations may include file types stored in various folders, file path segments, directory and file names, or any combination thereof. The resulting file classifications, and associated relationships between them, are then stored and indexed in the index repository of intent terms and content in step 516.

If a document file was selected in step 504, then it is analyzed in step 518 to identify sentences associated with one of more knowledge domains. The resulting sentences are then provided in step 520 to an intent determination system, such as a Natural Language (NL) classifier, for processing. In various embodiments, analysis operations are performed in step 518 on metadata associated with an image, video, audio, or other binary file to associate it with one or more knowledge domains. In these embodiments, the metadata is provided to the intent determination system for processing in step 520.

The resulting sentences, or metadata, provided in step 520 are then processed in step 522 to generate intent classification data, which in turn is processed to determine, and rank, the dominant intents associated with the selected file or folder. The resulting ranked, dominant intents, along with top terms and file names, are then stored in the index repository of intent and content in step 524. A determination is then made in step 526 whether to select another file or folder for processing. If so, then the process is continued, proceeding with step 504. Otherwise, file and folder intent determination operations are ended in step 528.

Figure 6:
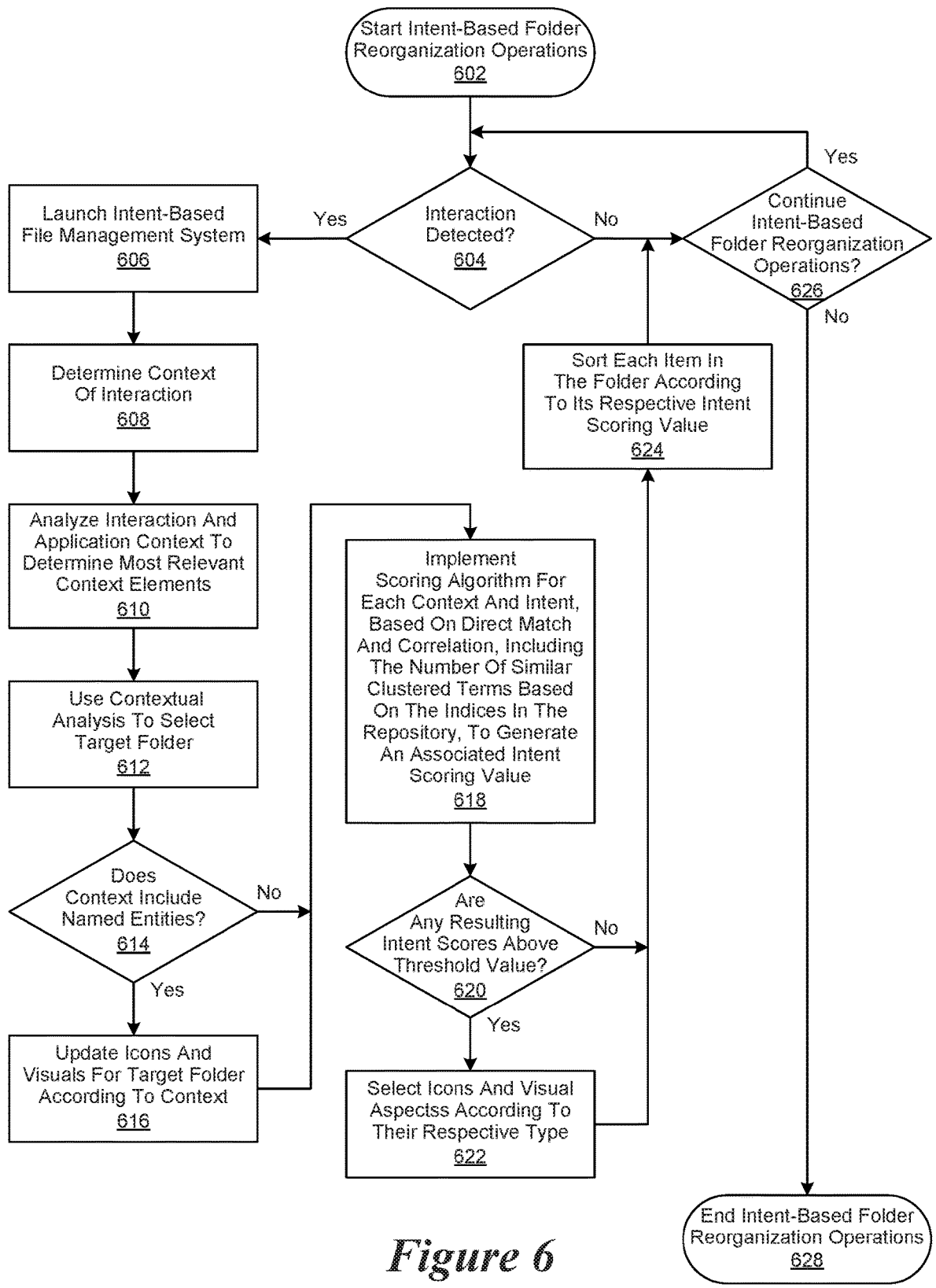
FIG. 6 is a generalized flowchart of the performance of intent-based folder reorganization operations.

FIG. 6 is a generalized flowchart of the performance of intent-based folder reorganization operations implemented in accordance with an embodiment of the invention. In this embodiment, intent-based folder reorganization operations are begun in step 602, followed by a determination being made in step 604 whether an interaction has been detected. The method by which the interaction is detected is a matter of design choice. If it is determined in step 604 that an interaction was not detected, then a determination is made in step 626 whether to continue intent-based folder reorganization. If so, then the process is continued, proceeding with step 604. Otherwise, intent-based folder reorganization operations are ended in step 628.

However, if it was determined in step 604 that an interaction was detected, then an intent-based file management system is launched in step 606, and then used in step 608 to determine the application context of the interaction, as described in greater detail herein. Then, in step 610, the detected interaction and its associated application context is analyzed to determine context elements that are relevant to the operation of the intent-based file management system, such as extracted entities. The resulting contextual analysis is then used in step 612 to select a target folder.

A determination is then made in step 614 whether the application context includes named entities. If so, then the application context is used in step 616 to modify certain visual attributes (e.g., color scheme, graphical elements, typeface, layout, etc.) of the folder and its associated icons, as described in greater detail herein. Thereafter, or if it was determined in step 614 that the application context does not contain named entities, a scoring algorithm is applied in step 618 to each application context and user intent, based upon direct match and correlation, to respectively generate an associated intent scoring value, as described in greater detail herein.

A determination is then made in step 620 whether any resulting intent scoring values are above a predetermined threshold value. If so, then icons and visual attributes are selected for the file or folder according to their respective type in step 622. Thereafter, or if it was determined in step 620 that none of the resulting intent scoring values were above the predetermined threshold value, each item in the target folder is sorted according to its respective intent scoring value. The process is then continued, proceeding with step 626.

Figure 7:
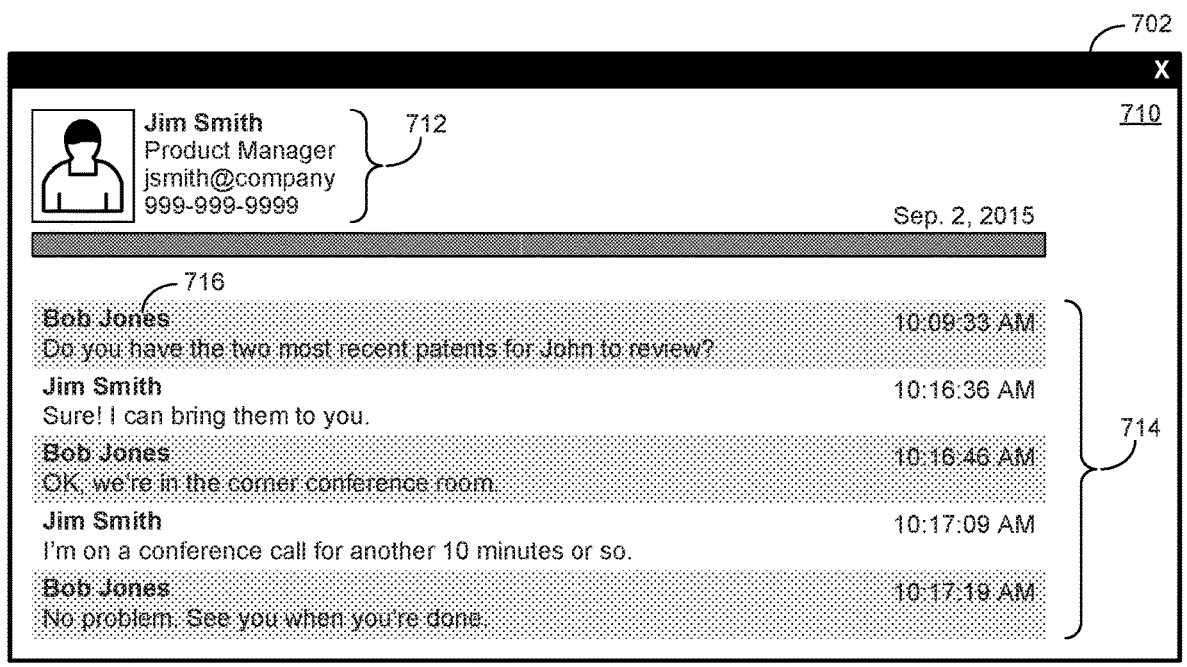
FIG. 7 shows the display of an online chat session conducted within a user interface (UI)

FIG. 7 shows the display of an online chat session conducted within a user interface (UI) implemented in accordance with an embodiment of the invention. In this embodiment, a UI window 702 associated with an online chat client is implemented to display an online chat session 714 between a first user 712 and a second user 716 within a UI sub-window 710. As described in greater detail herein, the online chat session 714 represents an interaction between the first user 712 and the second user 716, which in conjunction with their online chat clients, provides an application context.

For example, in this embodiment, the application context may include the identity of the first user 712 and the second user 716 conducting an online chat session 714, and the topic(s) of discussed during the online chat session 714. As shown in FIG. 7, the identity of the first user 712 and the second user 716 may include their respective names, titles, roles, location, and contact information. As likewise described in greater detail herein, the application context may include a user's (e.g., the first user 712, the second user 716, etc.) intent, which broadly refers to what the user desires to accomplish through the utilization of a particular software application, such as an online chat client.

Figure 8:
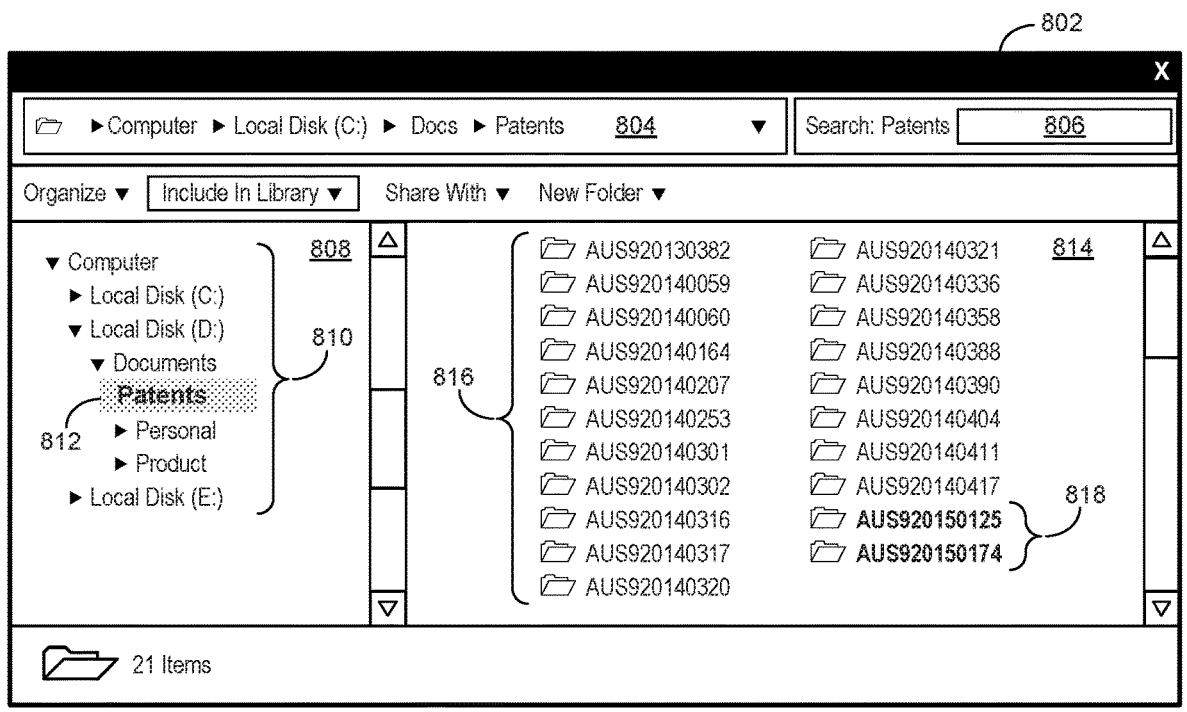
FIG. 8 shows the display of a hierarchical directory within a UI.

FIG. 8 shows the display of a hierarchical directory within a user interface (UI) implemented in accordance with an embodiment of the invention. In this embodiment, a UI window 802 associated with a file manager, described in greater detail herein, includes a file path sub-window 804, a keyword search sub-window 806, a directory sub-window 808, and a file information sub-window 814. As shown in FIG. 8, a directory structure 810 is displayed in the directory sub-window 808, and the contents of a corresponding sub-directory (e.g., "Patents") 816 is displayed within the file information sub-window 814.

In various embodiments, without implementation of various embodiments of the invention, a user would typically navigate the directory structure 810, select a sub-directory (e.g., "Patents") 812, view its contents 816 within the file information sub-window 814, and select files 818 (e.g., "AUS920150125," "AUS920150174") associated with an interaction, such as an email exchange. However, as described in greater detail herein, locating the files 818 (e.g., "AUS920150125," "AUS920150174") associated with an interaction would require foreknowledge of their location, or alternatively, knowledge of their respective names, which could be entered in the keyword search sub-window 806.

Figure 9:
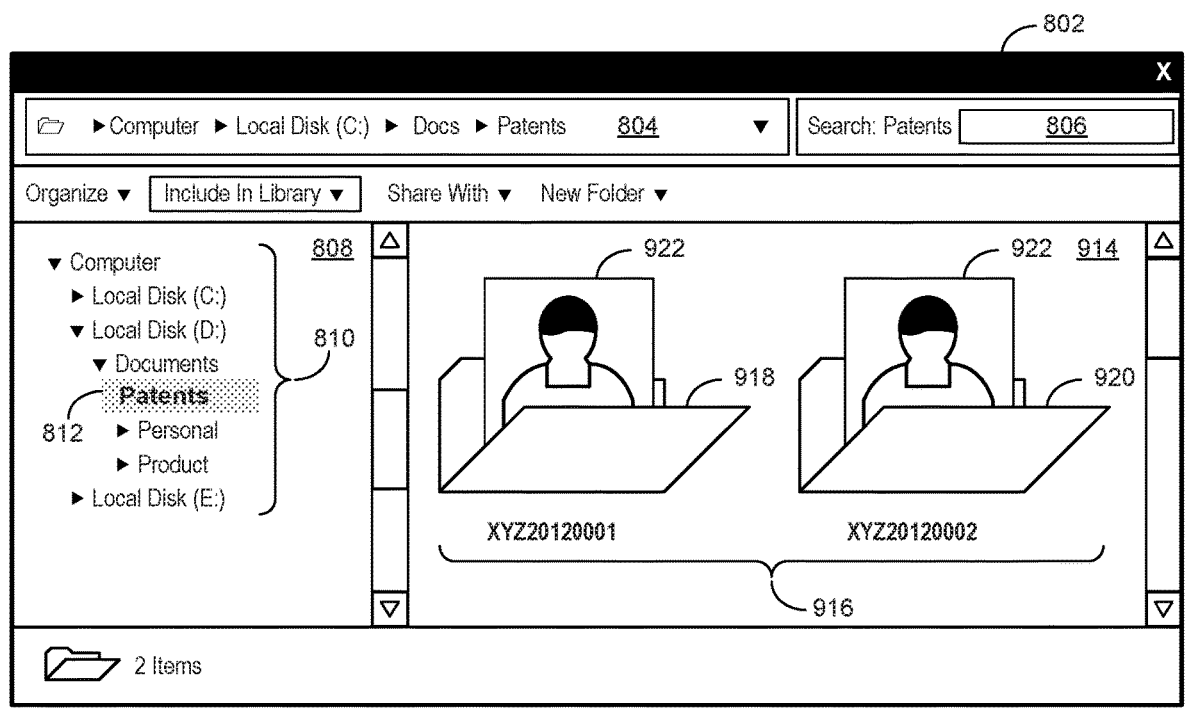
FIG. 9 shows the display of an intent-based search result within a UI.

FIG. 9 shows the display of an intent-based search result within a user interface (UI) implemented in accordance with an embodiment of the invention. In various embodiments, an intent-based file management system is implemented to operate in conjunction with a file manager to automatically present one or more contextually-relevant files to a user. In certain embodiments, the contextually-relevant files are automatically located and presented to the user without requiring the navigation of the directory structure or the performance of a key word search.

In this embodiment, a UI window 802 associated with a file manager includes a file path sub-window 804, a keyword search sub-window 806, a directory sub-window 808, and an intent-based file management system sub-window 914. As shown in FIG. 9, and as described in greater detail herein, files 916 most likely to be associated with an interaction, such as files "AUS920150125" 918 and "AUS920150174" 920, are automatically located and then displayed within the intent-based file management system sub-window 914. As likewise shown in FIG. 9, the source directory 812 of the files 916 most likely to be associated with an interaction is indicated within the directory sub-window 808 through the application of a visual attribute, such as highlighting or bolding, and also displayed within the file path sub-window 804.

As described in greater detail herein, visual attributes (e.g., color scheme, graphical elements, typeface, layout, etc.) of the folder and its associated file icons may be modified according to the application context associated with an interaction (e.g., an online chat session, response to an email, etc.). For example, as shown in FIG. 9, icons showing a graphical image 922 of either the sender or recipient of an email may be associated with files "XYZ20120001" 918 and "XYZ20120002" 920, and then displayed within the intent-based file management system sub-window 914. Once displayed, the user can select the desired file (e.g., "XYZ20120001" 918 and "XYZ20120002" 920) through a user gesture, such as a finger tap or a mouse-click, on the file's associated icon.

In one embodiment, selection of a presented file results in its automatic attachment to an email or online chat message. In another embodiment, selection of a presented file results in the selected file being opened by an associated software application. In various embodiments, the contextually-relevant files presented to a user may be located in different file directories. Those of skill in the art will recognize that many such embodiments are possible and that the foregoing is not intended to limit the spirit, scope or intent of the invention.

Figure 10:
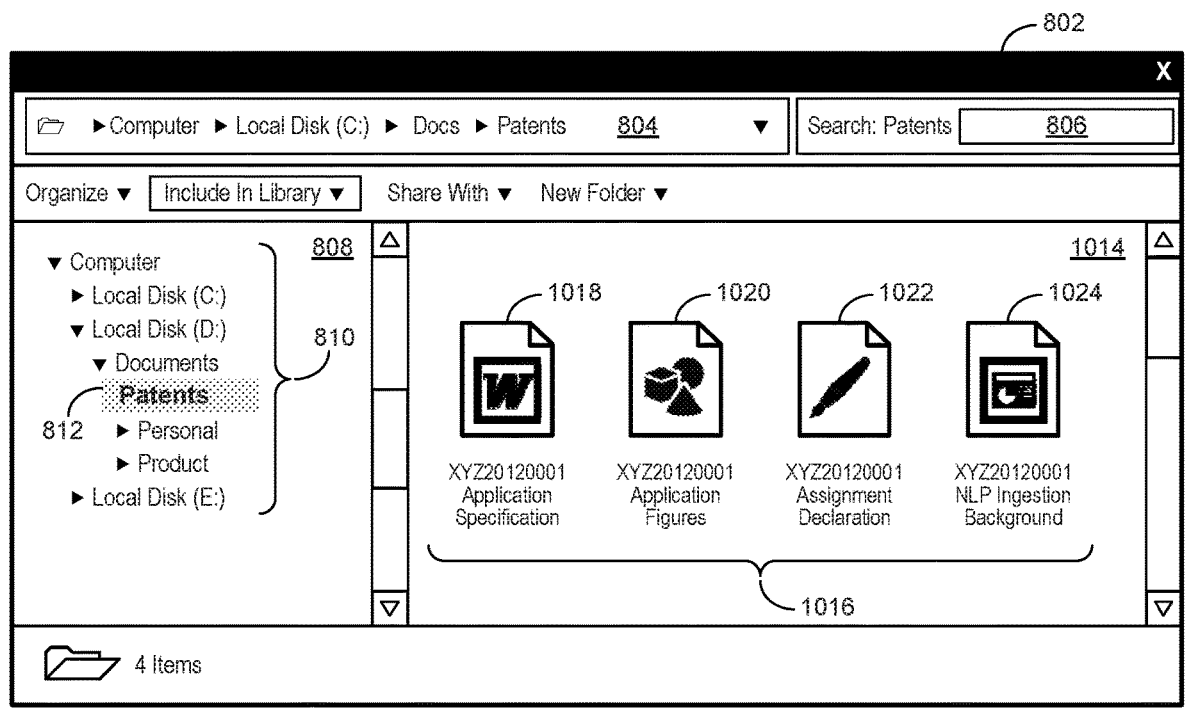
FIG. 10 shows the display of a prioritized intent-based search result within a UI.

FIG. 10 shows the display of a prioritized intent-based search result within a user interface (UI) implemented in accordance with an embodiment of the invention. In various embodiments, as described in greater detail herein, a scoring algorithm is applied to each application context and user intent related to an interaction, based upon direct match and correlation, to respectively generate an associated intent scoring value. In certain of these embodiments, the direct match and correlation includes the number of similar clustered terms, based upon associated indices stored in an index repository of intent terms and content. In one embodiment, the scoring algorithm weights named entities higher than synonyms, which are in turn weighted higher than direct terms.

If any resulting intent scoring values are above a predetermined threshold value, then icons and visual attributes are selected for the file or folder according to their respective type. Thereafter, each item in the current folder is sorted or rearranged according to its respective intent scoring value. The resulting folder view and file icons are then presented, with their associated visual attributes, to the user in their rearranged order. The method by which the resulting folder view and file icons are presented, and their associated visual attributes are selected, is a matter of design choice.

In this embodiment, a UI window 802 associated with a file manager includes a file path sub-window 804, a keyword search sub-window 806, a directory sub-window 808, and an intent-based file management system sub-window 1014. As shown in FIG. 10, icons 1018, 1020, 1022, 1024 corresponding to files 1016 most likely to be associated with an interaction are displayed within the intent-based file management system sub-window 1014, in their rearranged order and with their associated visual attributes, according to their respective intent scoring value and file types. For example, icon 1018 may be associated with a document file, icon 1020 may be associated with a graphics file, icon 1022 may be associated with a document file requiring a signature, and icon 1023 may be associated with a presentation file. Skilled practitioners of the art will recognize that many such embodiments and examples are possible and the foregoing is not intended to limit the spirit, scope or intent of the invention.

Although the present invention has been described in detail, it should be understood that various changes, substitutions and alterations can be made hereto without departing from the spirit and scope of the invention as defined by the appended claims.

What is claimed is:

1. A computer-implemented method for computing file system management, comprising:
processing a corpus of content to extract metadata associated with individual folders and files referenced by a directory structure;
performing Natural Language Processing (NLP) operations on the corpus to generate concept and entity data associated with each folder and file, the NLP operations comprising performing domain clustering, the domain clustering comprising performing a statistical analysis of a density of concepts associated with a particular knowledge domain within the corpus;
performing Natural Language (NL) classification operations on each folder and file to generate intent classification data;
processing the intent classification data to determine ranked, dominant intents for each folder and file;
processing the content, the extracted metadata, the concept and entity data, and the ranked dominant intents to generate indexed content and term data;
detecting an interaction associated with a first user;
processing the interaction associated with the first user to determine a user intent, the user intent representing what the first user desires to accomplish through the interaction of a particular application, the user intent being determined by monitoring, analyzing current and historic interactions of the user with the particular software application at a particular time and location;
accessing the indexed content and term data based upon the user intent; and,
presenting a folder view and file icons in an order based upon the indexed content and term data.

2. The method of claim 1, further comprising:
detecting an interaction associated with a first user;
collecting application context data associated with the interaction;
processing the application context data to determine the user intent;
processing the user intent and the indexed content and term data to identify a folder and file corresponding to the user intent; and
providing a reference to the identified folder and file to the first user.

3. The method of claim 1, wherein the NLP operations further comprise at least one of the group of:
entity detection; and
identity resolution.

4. The method of claim 2, wherein the application context data comprises information associated with at least one of the group of:
a software application executing on a computing device used by the first user;
a file type associated with a software application executing on a computing device used by the first user;
an online chat session conducted between the first user and a second user;
an email exchange between the first user and a second user;
a browser application executing on a computing device used by the first user to access web-based content;
a search query submitted by the first user; and
a response to a search query submitted by the first user.

5. The method of claim 2, further comprising:
processing the application context data to modify a visual attribute associated with the reference to the folder and file;
using the modified visual attribute as the reference to the folder and file.

6. The method of claim 2, further comprising:
processing the application context data and the user intent to generate a corresponding intent scoring value for each folder and file;
sorting the folders and files according to their respective intent scoring values; and
providing references to the folders and files to the first user in their sorted order.

7. A system comprising:
a processor;
a data bus coupled to the processor; and
a computer-usable medium embodying computer program code, the computer-usable medium being coupled to the data bus, the computer program code used for computing file system management and comprising instructions executable by the processor and configured for:
processing a corpus of content to extract metadata associated with individual folders and files referenced by a directory structure;
performing Natural Language Processing (NLP) operations on the corpus to generate concept and entity data associated with each folder and file, the NLP operations comprising performing domain clustering, the domain clustering comprising performing a statistical analysis of a density of concepts associated with a particular knowledge domain within the corpus;
performing Natural Language (NL) classification operations on each folder and file to generate intent classification data;
processing the intent classification data to determine ranked, dominant intents for each folder and file;
processing the content, the extracted metadata, the concept and entity data, and the ranked dominant intents to generate indexed content and term data;
detecting an interaction associated with a first user;
processing the interaction associated with the first user to determine a user intent, the user intent representing what the first user desires to accomplish through the interaction of a particular application, the user intent being determined by monitoring, analyzing current and historic interactions of the user with the particular software application at a articular time and location;
accessing the indexed content and term data based upon the user intent; and,
presenting a folder view and file icons in an order based upon the indexed content and term data.

8. The system of claim 7, further comprising:
detecting an interaction associated with a first user;
collecting application context data associated with the interaction;
processing the application context data to determine the user intent;
processing the user intent and the indexed content and term data to identify a folder and file corresponding to the user intent; and
providing a reference to the identified folder and file to the first user.

9. The system of claim 7, wherein the NLP operations further comprise at least one of the group of:
entity detection; and
identity resolution.

10. The system of claim 8, wherein the application context data comprises information associated with at least one of the group of:
a software application executing on a computing device used by the first user;
a file type associated with a software application executing on a computing device used by the first user;
an online chat session conducted between the first user and a second user;
an email exchange between the first user and a second user;
a browser application executing on a computing device used by the first user to access web-based content;
a search query submitted by the first user; and
a response to a search query submitted by the first user.

11. The system of claim 8, further comprising:
processing the application context data to modify a visual attribute associated with the reference to the folder and file;
using the modified visual attribute as the reference to the folder and file.

12. The system of claim 8, further comprising:
processing the application context data and the user intent to generate a corresponding intent scoring value for each folder and file;
sorting the folders and files according to their respective intent scoring values; and
providing references to the folders and files to the first user in their sorted order.

13. A non-transitory, computer-readable storage medium embodying computer program code, the computer program code comprising computer executable instructions configured for:
processing a corpus of content to extract metadata associated with individual folders and files referenced by a directory structure;
performing Natural Language Processing (NLP) operations on the corpus to generate concept and entity data associated with each folder and file, the NLP operations comprising performing domain clustering, the domain clustering comprising performing a statistical analysis of a density of concepts associated with a particular knowledge domain within the corpus;
performing Natural Language (NL) classification operations on each folder and file to generate intent classification data; processing the intent classification data to determine ranked, dominant intents for each folder and file;
processing the content, the extracted metadata, the concept and entity data, and the ranked dominant intents to generate indexed content and term data;
detecting an interaction associated with a first user;
processing the interaction associated with the first user to determine a user intent, the user intent representing what the first user desires to accomplish through the interaction of a particular application, the user intent being determined by monitoring, analyzing current and historic interactions of the user with the particular software application at a particular time and location;
accessing the indexed content and term data based upon the user intent; and,
presenting a folder view and file icons in an order based upon the indexed content and term data.

14. The non-transitory, computer-readable storage medium of claim 13, further comprising:
detecting an interaction associated with a first user;
collecting application context data associated with the interaction;
processing the application context data to determine the user intent;
processing the user intent and the indexed content and term data to identify a folder and file corresponding to the user intent; and
providing a reference to the identified folder and file to the first user.

15. The non-transitory, computer-readable storage medium of claim 13, wherein the NLP operations further comprise at least one of the group of:
entity detection; and
identity resolution.

16. The non-transitory, computer-readable storage medium of claim 14, wherein the application context data comprises information associated with at least one of the group of:
a software application executing on a computing device used by the first user;
a file type associated with a software application executing on a computing device used by the first user;
an online chat session conducted between the first user and a second user;
an email exchange between the first user and a second user;
a browser application executing on a computing device used by the first user to access web-based content;
a search query submitted by the first user; and
a response to a search query submitted by the first user.

17. The non-transitory, computer-readable storage medium of claim 14, further comprising:
   processing the application context data to modify a visual attribute associated with the reference to the folder and file;
   using the modified visual attribute as the reference to the folder and file.

18. The non-transitory, computer-readable storage medium of claim 14, further comprising:
   processing the application context data and the user intent to generate a corresponding intent scoring value for each folder and file;
   sorting the folders and files according to their respective intent scoring values; and
   providing references to the folders and files to the first user in their sorted order.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *